CONVEYOR-TYPE CELLULAR MAGAZINE DISPENSER

Original Filed Aug. 3, 1965

INVENTORS
William G. Freise and
Benjamin M. Przybyszewski
by Mullin & Siegel
Att'ys

CONVEYOR-TYPE CELLULAR MAGAZINE DISPENSER

Original Filed Aug. 3, 1965

INVENTORS
William G. Freise and
Benjamin M. Przybyszewski
by Mullin & Siegel
Attys CONVEYOR-TYPE CELLULAR MAGAZINE DISPENSER
Original Filed Aug. 3, 1965
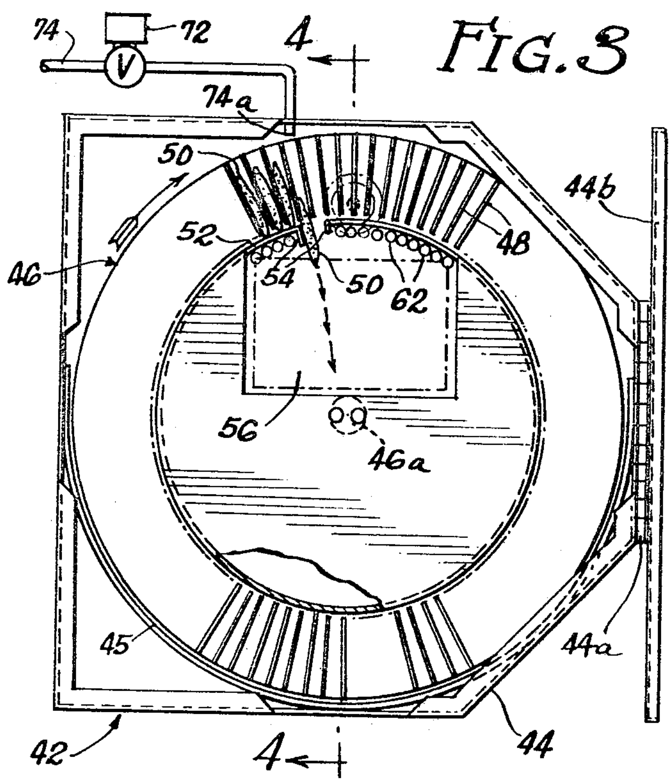
FIG. 3
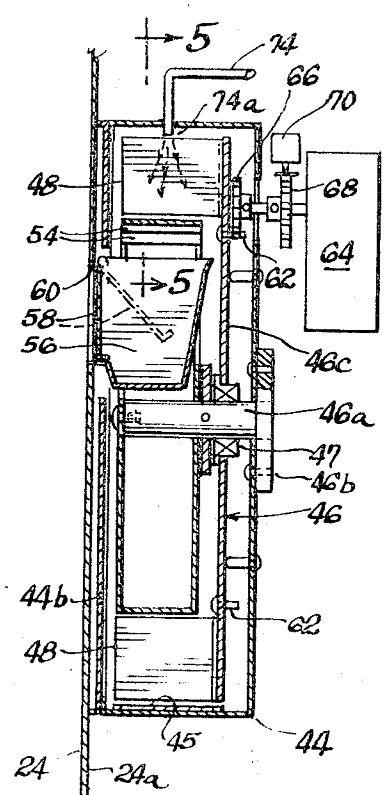
FIG. 4
FIG. 5
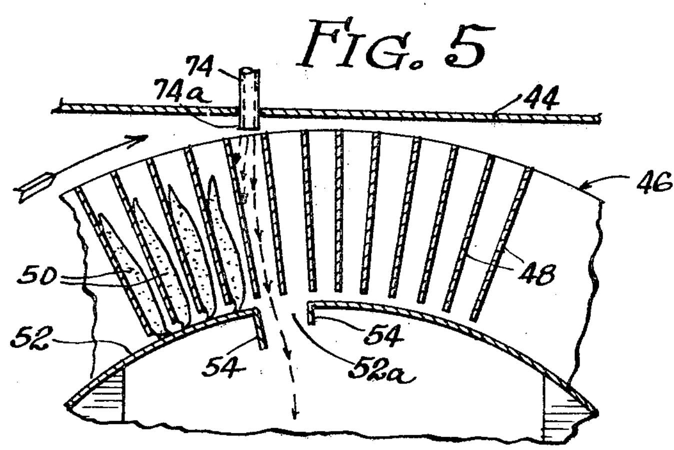
FIG. 6
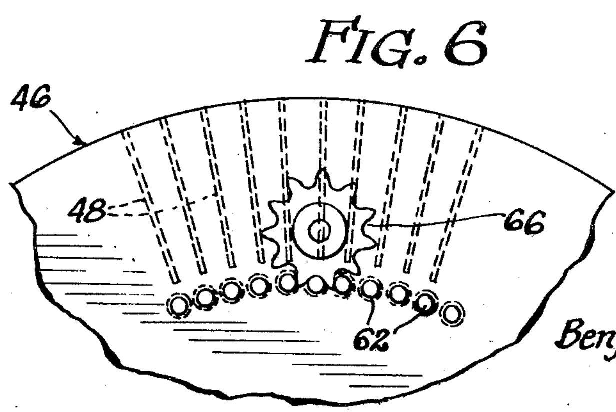
INVENTORS
William G. Freise and
Benjamin M. Przybyszewski
by Mullin & Siegel
Attys

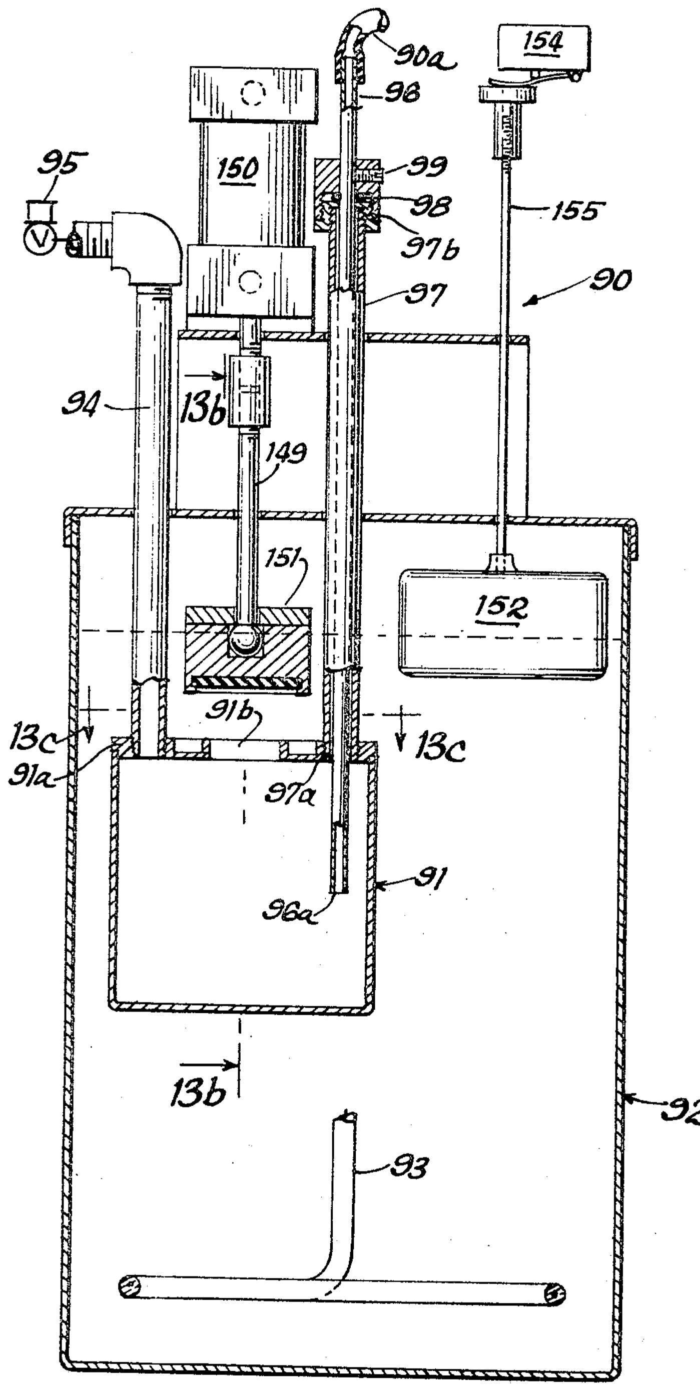
FIG. 7a
FIG. 7b
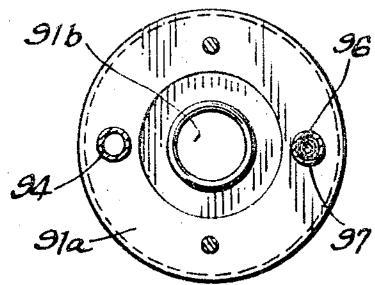
FIG. 7c
INVENTORS
William G. Freise
Benjamin M. Przybyszewski
by Mullin & Siegel
Attys 3,521,790
CONVEYOR-TYPE CELLULAR MAGAZINE DISPENSER William G. Freise and Benjamin M. Przybyszewski, Chicago, Ill., assignors, by mesne assignments, to Paymax Syrup Corporation, Chicago, Ill., a corporation of Illinois Original application Aug. 3, 1965, Ser. No. 476,977, now Patent No. 3,421,430. Divided and this application Apr. 12, 1968, Ser. No. 769,458
Int. Cl. G07f *11/16*
U.S. Cl. 221—81 2 Claims

ABSTRACT OF THE DISCLOSURE

This invention relates to a liquid dispensing device for beverages and, more particularly, to a liquid dispensing device that enables the individual brewing of beverages.

This application is a division of our co-pending application, Ser. No. 476,977 filed Aug. 3, 1965, now Pat. No. 3,421,430.

In brewing beverages individually for dispensing in the vending industry the flavor thereof is of primary importance. Although liquid dispensing devices in the past have individually brewed beverages, mechanical failure usually rendered them incapable of dispensing tasty beverages. Our device in obviating the probability of mechanical failure by mechanical simplicity not only accomplishes individual brewing, but also dispenses beverages which are both flavorful and appealing. It should be understood, that although we will describe our device with relation to coffee and tea brewing, our device is equally adapted to other comparable beverages. It is therefore a primary object of this invention to provide a new and improved beverage dispensing device which brews coffee that is tasty with a structure which is both simple and foolproof in operation.

It is still even further an object of this invention to provide a beverage dispensing device for brewing tea wherein the strength of the tea can be selectively chosen in accordance with the tastes of the operator.

To accomplish the aforestated main objectives of both taste and simplicity in mechanical operation an important feature of our device has to do with a new and improved hot water feeding system that delivers a pre-selected quantity of hot water for brewing purposes.

Still even further, our liquid dispensing device incorporates a new and improved tea bag dispenser which furnishes individual bags of tea for selectible brewing thereof with hot water.

Other and further objects and features of our invention will become more readily apparent from the following description when read in conjunction with the drawings wherein:

FIG. 3 is a side elevational view of our new and improved tea bag dispenser with the cover thereof in its open position;

FIG. 4 is a sectional view of FIG. 3 taken along a plane passing through the line 4—4 and looking in the direction indicated;

FIG. 5 is a partial enlarged sectional view of FIG. 4 taken on a plane passing through the line 5—5 and looking in the direction indicated;

FIG. 6 is an enlarged fragmentary view of FIG. 3 illustrating the driving sprocket of our new and improved tea bag dispenser;

FIG. 7*a* is a partial cross sectional view of our hot water dispensing device;

FIG. 7*b* is a partial sectional view of FIG. 7*a* taken along a plane passing through the line *b*—*b* looking in the direction indicated; and FIG. 7*c* is a partial sectional view of FIG. 7*a* taken along a plane passing through the line *c*—*c* and looking in the direction indicated.

Referring generally to the drawings, the improvements contributed by our beverage dispensing device can be said to reside in two general areas—our tea bag dispenser and our improved coffee brewing arrangement. Our tea bag dispenser automatically dispenses tea bags individually along with hot water from the machine so that the operator of the machine can mix the tea with the hot water to produce tea of varying strength. Our new brewing arrangement brews coffee individually with mechanical simplicity and includes the aforestated new features relating to predetermined feeding of hot water, feeding and dispensing the filter paper so that new filter paper can be used for brewing each cup of coffee, keeping the brewing chamber clean and finally electrically controlling the length of brewing time in accordance with the actual mixing of the hot water and coffee. Since the sequence of operations of our device is controlled by conventional timing motor operated cams and switches and the circuitry with regard to same is generally well known, the description of the circuitry, with the exception of our electrical means for controlling the length of brewing in accordance with the actual mixing of the hot water and coffee will here be omitted.

Figure 1:
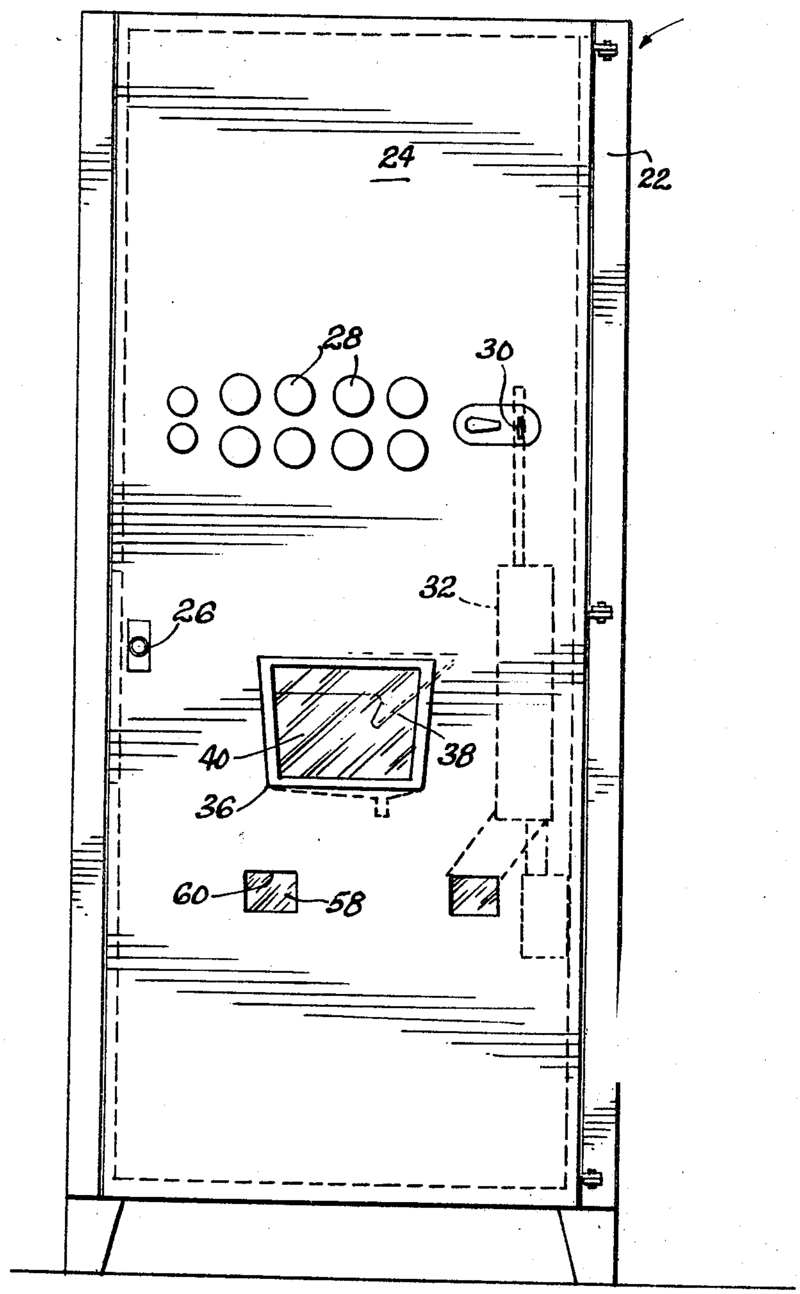
FIG. 1 is a side elevational view of the front of our new and improved beverage dispensing device when the door thereof is closed.

Referring more particularly to the drawings wherein like characters of reference indicate corresponding parts throughout, the front of our new and improved beverage dispensing device 20 is generally illustrated in FIG. 1. As in other vending devices, it is housed in a cabinet 22 which has a front door 24 hingedly associated therewith, said front door having a key lock 26 for security means. Various actuating buttons 28 protrude through the front door 24 to enable the operator of our dispensing device to select a desired drink by actuation thereof after a coin has been inserted in the coin slot 30. The coin slot 30 is associated with a coin acceptance machine 32 in the usual and well-known manner so that when a coin is inserted in the coin slot the beverage dispensing device is actuated into operation. Once the vending machine is actuated into operation, the beverage to be dispensed is brewed and a cup (not shown) is disposed in a cup magazine 36 via a cup chute 38 and thereafter receives the brewed beverage. The cup magazine 36 which has an access door 40 is opened and access to the cup and beverage contained therein is gained.

Figure 2:
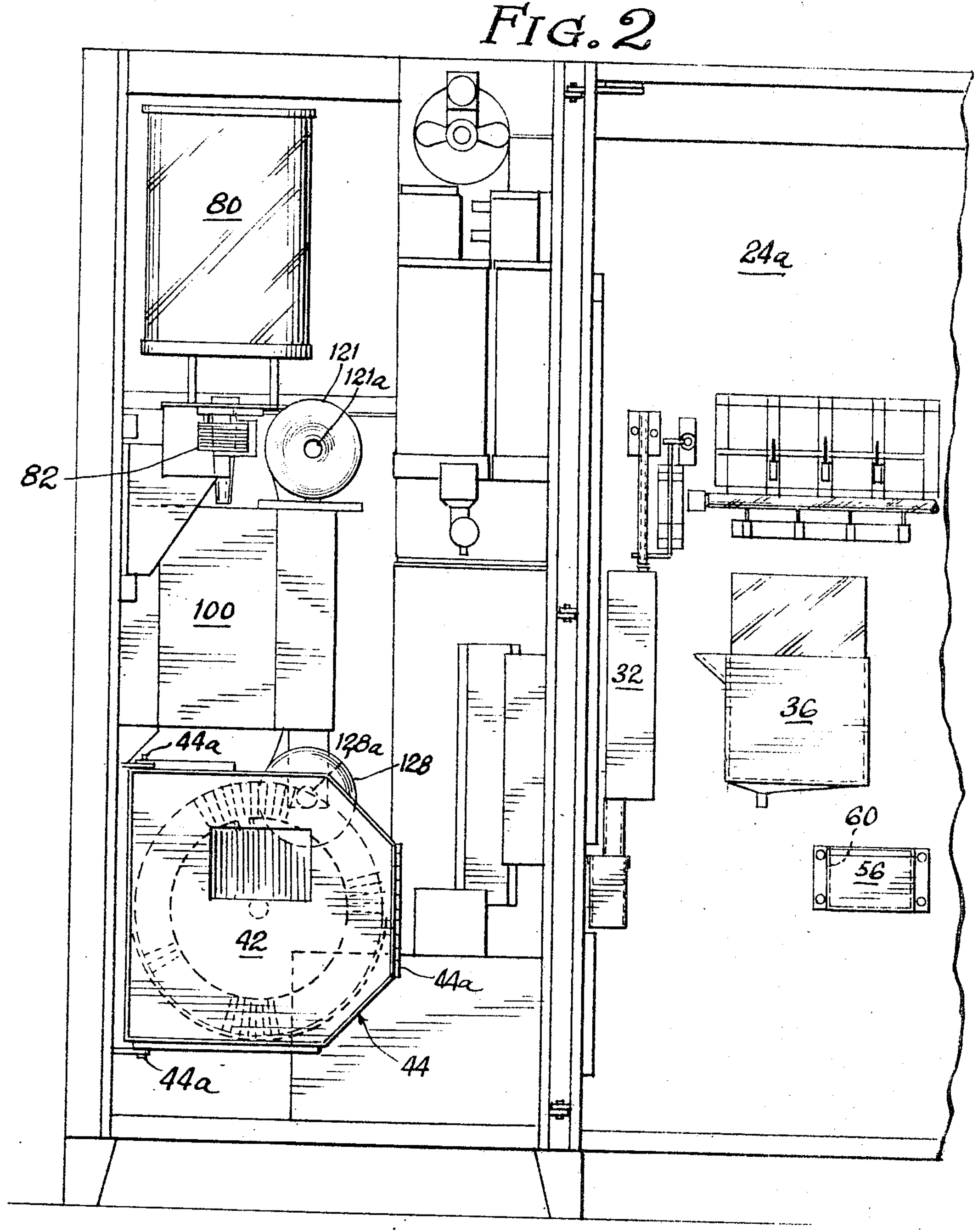
FIG. 2 is a side elevational view of the front or our new and improved beverage dispensing device with the front door thereof opened.

Referring to FIG. 2, the front of the inside of the beverage dispensing device 20 can be seen together with the back **24*a* of the front door 24. Our new and improved tea bag dispenser 42** is preferably illustrated as being proximately disposed to the bottom of our device.

The tea bag dispenser 42 comprises a polygonal casing 44 which is hingedly associated at one side thereof at **44*a* to the cabinet 22 of the beverage dispensing device so that it can be swung out when access to the back of the beverage dispensing device is desired. The casing 44 of the the bag dispenser has a cover 44*b* hingedly associated therewith as shown in FIG. 3 where it is in its open position. As seen in FIGS. 3 and 4, the tea bag dispenser has a vaned wheel 46 rotatably journalled therein at the central shaft 46*a* thereof by sealed bearing means 47. The central shaft 46*a* is rigidly associated with the back of the polygonal casing 44 by means of the plate member 46*b*. Vanes 48 are spaced apart around the periphery of the wheel 46 in order that tea bags such as 50 can be stored therein and selectively dispensed. An inner casing 52 prevents the tea bags from being dispensed as the wheel 46 rotates until the vanes are aligned with the opening 52***a* of the inner casing as illustrated in FIGS. 3 and 5.

To prevent the tea bags from falling out of the vanes 48, an arcuate rim 45 conforming to the outer periphery of the vaned wheel 46 is associated with the polygonal casing 44 and proximately disposed with relation to the bottom of the vaned wheel. Chute members 54 extend from the inner casing at the opening 52*a* to guide the tea bags into a tea bag magazine 56 which extends from the back 24*a* of the front door 24 and is disposed as illustrated in FIG. 4 when in operation. The tea bag magazine has an access door 58 hingedly associated therewith and aligned with an access opening 60 which is formed in the front door 24. Sprocket pegs 62 are peripherally disposed around the rear member 46*c* of the vaned wheel to associate the wheel with a fractional horsepower motor 64 by means of a sprocket 66 which is associated with a cam 68 as illustrated in FIGS. 4 and 6. A cam switch 70 is associated with the cam 68 to stop the motor 64 when it receives an impulse. A conduit 74 having an air valve 72 which controls the flow of compressed air therethrough is associated with the tea bag dispenser 42 and the end 74*a* of the conduit 74 protrudes through the casing 44 of the tea bag dispenser as illustrated in FIGS. 3, 4 and 5. Therefore when tea bags are proximately disposed with relation to said conduit, the tea bags are forced from the vanes and into the tea bag magazine 56. A solenoid (not shown) triggers the air valve 72 to release the compressed air flowing through the conduit 74 when it is desired to dispense a tea bag. The cam 68 is slotted so that the motor is stopped by the cam switch 70 each time a vane 46 is in position to dispense a tea bag. Thus, the tea bag dispenser can have its vaned wheel rotated fractionally through 360° to dispense all of the tea bags contained therein.

From a description of the operation of our new and improved tea bag dispenser, it can be seen that an individual tea bag can be dispensed from our machine to enable the operator of the machine to brew tea of varying strength with hot water dispensed by our device. In reviewing the sequence of operation of our dispensing machine with relation to brewing tea with our new and improved tea bag dispenser, the operator merely inserts a coin and our machine feeds a predetermined amount of hot water to a cup in the cup magazine as will be explained hereinafter. At the same time, the tea bag dispenser has the vaned wheel thereof actuated by the motor and moved to a position where the cam switch stops the vaned wheel and a tea bag can be forced through the chutes 54 by means of compressed air flowing through the conduit 74. Compressed air is allowed to flow through the end 74*a* of conduit 74 by releasing the valve 72 when the motor is actuated. After the tea bag is forced out of the vane and through the chutes 54, the motor is off, the valve 72 is closed, and the tea bag dispenser is then ready for another cycle of operation.

To provide our beverage dispensing machine with a predetermined amount of hot water for either brewing coffee or tea as has been above described, our hot water dispensing device 90 is associated with the conduit 90*a*. Our hot water dispensing device 90 comprises a small tank 91 disposed within a large tank 92. The large tank 92 has a heater 93 located therein for heating water disposed in it. The small tank is associated with compressed air by means of a conduit 94 which has a valve 93 that is released when it is desired to deliver a predetermined amount of hot water to the conduit 90*a* which communicates with the tank 91 through a dispensing conduit 96. The dispensing conduit extends through a tubular casing 97 which has a first end 97*a* threadedly associated with the top 91*a* of the small tank 91. The tubular casing 97 has a second end 97*b* which is threadedly associated with a bushing 98 that has set screw 99 associated therewith and disposed to adjustably hold the dispensing conduit in position. It therefore will be seen that the position of the lower end 96*a* of the dispensing conduit 96 can be selectively located with respect to the top and bottom of the tank 91. The top 91*a* of the tank 91 has a large opening 91*b*, submerged below the water level of the large tank, through which hot water from the large tank 92 flows when it is desired to fill the small tank 91 with hot water. To control the flow of hot water through the opening 91*b* an air piston 150 has a gasketed diaphragm 151 attached thereto by means of a shaft 149 and the gasketed diaphragm is moved reciprocatingly from an open position illustrated in FIG. 7*a* to a closed position illustrated in FIG. 7*b* where the gasketed diaphragm blocks the opening 91*b* and prevents the flow of water through said opening. When it is desired to feed a predetermined amount of hot water to the conduit 90*a*, the air piston 150 merely actuates the gasketed diaphragm to its closed position illustrated in FIG. 7*b*, and then the valve 95 is released and compressed air forces the hot water in the small tank 91 through the bottom 96*a* of the dispensing conduit 96 to the conduit 90*a*. With this type of arrangement, the amount of water dispensed from the small tank 91 is completely dependent on the position of the lower end 96*a* of the dispensing conduit with respect to the bottom of the small tank 91. The small tank 91 can only feed water to the conduit 90*a* as long as the lower end 96*a* of the dispensing conduit 96 is in communication with the water level. Thus, if the small tank 91 was completely filled and the dispersing conduit was positioned as illustrated in FIG. 7*a*, the small tank would dispense water until the position of the water level was aligned with the lower end of the dispensing conduit 96*a* as illustrated in FIG. 7*b*. Once a predetermined amount of water is fed to the conduit 90*a*, the valve 95 is closed and the piston 150 is moved to its open position to enable a fresh supply of hot water to be delivered to the small tank 91.

To automatically replenish the level of water in the large tank 92 we have provided a float 152 which is electrically associated with switch 154 by means of a stem 155 that extends from the float to the switch. When the water level drops below a certain point, and electric contact is no longer made with the switch 154, a valve (not shown which is associated with the switch 154 in the conventional manner allows more water to be fed to the tank 92.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention.

What is claimed is:

1. In a beverage dispensing device wherein bags of flavorant are dispensed, a bag dispenser associated with said beverage dispensing device, comprising: a casing, a wheel having vanes disposed around the periphery thereof, said vanes being spaced apart to removably receive individual bags between each of said vanes, said vanes projecting radially inward toward the center of said wheel, a circular shaped inner casing mounted adjacent to said wheel, said inner casing having an opening formed by chute members extending from said inner casing and directed toward an access means of the dispensing machine, an arcuate rim disposed around the bottom of the periphery of said wheel to prevent said bags from falling out of said vanes, and a compressed air means associated with said casing and disposed to force said bags through said opening in said inner casing, means for rotatably driving said wheel in order that said bags can each be positioned adjacent to said opening, and valve means to selectively release said compressed air to force said bags through said opening in said inner casing each time a bag is positioned adjacent to said opening.

2. In a beverage dispensing device, as defined in claim 1, said wheel having pegs peripherally disposed and protruding therefrom, said rotating means including a motor associated with a sprocket, said sprocket having teeth spaced apart for receiving each of said pegs therebetween, and means for controlling said motor to rotate said sprocket fractionally in order to engage each of said pegs and position each of said bags proximate to said opening in said inner casing.

References Cited

UNITED STATES PATENTS

| | | | |
|---|---|---|---|
| 233,095 | 10/1880 | Hill | 221—278 X |
| 1,236,163 | 8/1917 | Hackett et al. | 221—82 X |
| 1,741,728 | 12/1929 | Nemeth | 221—86 |
| 1,913,917 | 6/1933 | Crowe | 221—82 |
| 2,239,176 | 4/1941 | Waitzman | 221—82 X |

SAMUEL F. COLEMAN, Primary Examiner